(12) United States Patent
Perahia et al.

(10) Patent No.: US 7,352,718 B1
(45) Date of Patent: Apr. 1, 2008

(54) SPATIAL DIVISION MULTIPLE ACCESS FOR WIRELESS NETWORKS

(75) Inventors: Eldad Perahia, Sunnyvale, CA (US);
Bretton Douglas, San Jose, CA (US);
David Pignatelli, Saratoga, CA (US);
David Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 960 days.

(21) Appl. No.: 10/624,653

(22) Filed: Jul. 22, 2003

(51) Int. Cl.
*H04J 3/16* (2006.01)
*H04Q 7/00* (2006.01)
*H04B 7/00* (2006.01)

(52) U.S. Cl. .............. 370/329; 370/210; 370/346; 370/437; 375/219; 700/53

(58) Field of Classification Search ........... 370/329, 370/341–346, 349, 437, 468, 471, 210, 321, 370/337; 375/219, 270, 301, 347; 455/101, 455/272, 562.1; 700/53
See application file for complete search history.

(56) References Cited

U.S. PATENT DOCUMENTS

| | | | | |
|---|---|---|---|---|
| 5,600,672 A | * | 2/1997 | Oshima et al. | 375/219 |
| 6,067,290 A | * | 5/2000 | Paulraj et al. | 370/329 |
| 6,097,771 A | | 8/2000 | Foschini | 375/346 |
| 6,317,466 B1 | | 11/2001 | Foschini et al. | 375/267 |
| 6,377,631 B1 | | 4/2002 | Raleigh | 375/299 |
| 6,721,302 B1 | * | 4/2004 | Alastalo | 370/346 |
| 2002/0193146 A1 | * | 12/2002 | Wallace et al. | 455/562 |
| 2003/0072452 A1 | | 4/2003 | Mody et al. | 380/274 |
| 2003/0076777 A1 | | 4/2003 | Stuber et al. | 370/206 |
| 2003/0128658 A1 | * | 7/2003 | Walton et al. | 370/208 |
| 2004/0052228 A1 | * | 3/2004 | Tellado et al. | 370/334 |
| 2004/0081123 A1 | * | 4/2004 | Krishnan et al. | 370/329 |

OTHER PUBLICATIONS

Gurbuz, Ozgur et al., "Media Access Control for Mimo Wireless Network," U.S. Appl. No. 10/197,300, filed Jul. 15, 2002, 26 pages w/ 9 pages of drawing.
Perahia, Eldad et al., "High Data Rate Wireless Bridging," U.S. Appl. No. 10/335,500, filed Dec. 31, 2002, 38 pages w/ 6 pages of drawing.
IEEE Standard 802.11a-1999, "Part 11: Wireless LAN Medium Access Control (MAC) and Physical Layer (PHY) Specifications, High-Speed Physical Layer in the 5 GHz Band," Sep. 1999, pp. 1-83.

* cited by examiner

*Primary Examiner*—Afsar Qureshi
(74) *Attorney, Agent, or Firm*—Cindy Kaplan

(57) ABSTRACT

Multiple Input Multiple Output (MIMO) technology in conjunction with the IEEE 802.11 standard enables simultaneous communication of data packets to or from multiple users in the same frequency. Spatial divisional multiple access (SDMA) is thus provided. In this way, system capacity can be increased to an extent that depends on available antenna resources and the multipath characteristics of the communication channel. Doubling or quadrupling of network throughput can be achieved.

16 Claims, 7 Drawing Sheets

SPATIAL DIVISION MULTIPLE ACCESS FOR WIRELESS NETWORKS

STATEMENT OF RELATED APPLICATIONS

The present application is related to the subject matter of:
U.S. Pat. No. 6,377,631, issued on Apr. 23, 2002 entitled "TRANSMITTER INCORPORATING SPATIO-TEMPORAL PROCESSING;"

U.S. patent application Ser. No. 10/197,300; filed Jul. 15, 2002, entitled "MEDIA ACCESS CONTROL FOR MIMO WIRELESS NETWORKS;" and U.S. patent application Ser. No. 10/335,500; filed Dec. 31, 2002, entitled "HIGH DATA RATE WIRELESS BRIDGING."

The contents of the above applications are incorporated herein by reference in their entirety for all purposes.

BACKGROUND OF THE INVENTION

The present invention relates generally to communications and more particularly to system and methods for wireless communications.

As the Internet continues its development and workers and consumers increasingly rely on data networking to assist their day-to-day tasks, a need arises to extend network connectivity to locations where there is no convenient connection to a wired infrastructure. Workers desire to send and receive email and access the Internet and their corporate intranet even when they are away from their workstation. Consumers wish to establish home networks without costly and cumbersome wiring. Accordingly, wireless communication standards have evolved including the IEEE 802.11 family.

The current IEEE 802.11a standard allows for wireless communications at speeds between 6 Mbps and 54 Mbps on a given specified carrier frequency. However, in a situation where multiple clients or subscriber units interact with a central access point, it is the case that only one access point to subscriber unit communication can take place at once on a given carrier frequency. If more than one user attempts to transmit at a time, a packet collision will occur. It would be desirable to extend IEEE 802.11a data carrying capacity by allowing for simultaneous multiple transmissions in the same frequency.

One known way of allowing such multiple parallel transmissions is the use of MIMO (Multiple Input Multiple Output) techniques to provide SDMA (Spatial Division Multiple Access). MIMO techniques take advantage of multiple antennas or multiple polarizations of the same antenna at the transmitter or receiver to access multiple channel inputs or channel outputs and thereby define multiple spatial subchannels that occupy the same bandwidth but nonetheless are capable of carrying independent data streams. The delineation of the multiple spatial subchannels may involve weighting of the antenna inputs of the transmitter or weighting of the antenna outputs at the receiver end. For further information on MIMO techniques, see U.S. Pat. No. 6,377,631. SDMA exploits the multiple spatial subchannels provided by MIMO processing to carry independent data streams to or from multiple transceivers.

It is desirable to apply MIMO-based SDMA techniques to IEEE 802.11 systems to increase data carrying capacity, but there are obstacles to overcome. The physical and media access control (MAC) layers defined by IEEE 802.11 assume that only one unit is transmitting at a time in a given carrier frequency. SDMA techniques rely on a certain amount of coordination of received power levels and timing among multiple simultaneous transmitters and 802.11 makes no provision for this type of coordination. Furthermore, 802.11 MAC operation typically assumes that an acknowledgement will be sent back after transmission of a single packet. However, in SDMA two packets of unequal length may commence transmission simultaneously and the acknowledgement of the shorter packet cannot commence immediately because the transmission of the longer packet continues to occupy the shared channel.

What is needed are systems and methods for applying MIMO and SDMA techniques to 802.11 operation and thereby allow for simultaneous transmissions by multiple users and increased system capacity.

SUMMARY OF THE INVENTION

Embodiments of the present invention incorporate Multiple Input Multiple Output (MIMO) technology in conjunction with the IEEE 802.11 standard to enable simultaneous communication of data packets to or from multiple users in the same frequency. Spatial divisional multiple access (SDMA) is thus provided. In this way, system capacity can be increased to an extent that depends on available antenna resources and the multipath characteristics of the communication channel. Doubling or quadrupling of network throughput can be achieved.

A first aspect of the present invention provides a method for operating an access point in a MIMO wireless communication system. The method includes: sending a first packet to a first subscriber unit via a first spatial subchannel and sending a second packet to a second subscriber unit via a second spatial subchannel, the first spatial subchannel and the second spatial subchannel occupying the same bandwidth. The second packet has greater data length than the first packet. Sending the first packet and sending the second packet begin and end substantially simultaneously.

A second aspect of the present invention provides a method for operating an access point in a MIMO wireless communication system. The method includes: for a plurality of subscriber units of the access point, identifying ranges of the subscriber units from the access point; assigning a first group of the subscriber units to transmit simultaneously during a first upstream transmission slot; and assigning a second group of the subscriber units to transmit simultaneously during a second upstream transmission slot. Subscriber units of the first group are chosen to have substantially similar ranges to one another and subscriber units of the second group are chosen to have substantially similar ranges to one another.

A third aspect of the present invention provides a method for operating an access point in a MIMO communication system. The method includes receiving a first packet from a first subscriber unit within a first spatial subchannel wherein a second packet has commenced transmission substantially simultaneously with the first packet. The second packet being transmitted within a second spatial subchannel shares bandwidth with the first spatial subchannel. The second packet is longer than the first packet. The method includes further transmitting an acknowledgement of the first packet to the first subscriber unit only after completing reception of the second packet.

A fourth aspect of the present invention provides a method for operating a subscriber unit in a MIMO communication system. The method includes: receiving a first packet from an access point in a first spatial subchannel; receiving a second packet from the access point simultaneously in a second spatial subchannel that shares bandwidth with the first spatial subchannel; and decoding only the first packet and not the second packet.

A fifth aspect of the present invention provides a method of operating a subscriber unit in a MIMO communication system. The method includes: transmitting an OFDM signal via a first spatial subchannel; transmitting first channel training information on the OFDM signal in a first channel training period; and, during a second channel training period, quieting the OFDM signal to allow transmission of second channel training information by another subscriber unit.

A sixth aspect of the present invention provides a method for operating an SDMA-capable subscriber unit in a wireless communication network. The method includes: during a contention period, requesting an access point for permission to switch between an SDMA mode and a non-SDMA mode and, upon receiving permission, switching between the SDMA mode and the non-SDMA mode.

A seventh aspect of the present invention provides a method for operating an access point in a wireless communication system having subscriber units operating in a SDMA mode and subscriber units operating in a non-SDMA mode. The method includes: maintaining a list of subscriber units operating in an SDMA mode and subscriber units operating in a non-SDMA mode and, within a designated contention free period, polling SDMA-mode subscriber units and non-SDMA-mode subscriber units for transmissions in corresponding non-overlapping subperiods of the contention free period.

Further understanding of the nature and advantages of the inventions herein may be realized by reference to the remaining portions of the specification and the attached drawings.

DESCRIPTION OF SPECIFIC EMBODIMENTS

Although having very broad applicability, the present invention will be described with reference to a representative network environment, a wireless communication network based on the IEEE 802.11 standard, and in one particular implementation, the IEEE 802.11a standard. The IEEE 802.11g standard is considered to be highly similar to the 802.11a standard in many relevant respects and wherever the present application refers to the 802.11a standard, it will be understood that this encompasses the 802.11g standard as well. Also, it will be appreciated that the present invention may also be implemented in conjunction with the 802.11e standard that provides various MAC layer enhancements. The technical details of these standards are well-known to those of skill in the art and familiarity with them will be assumed in the discussion that follows. Relevant descriptive materials regarding the IEEE 802.11 standards may be found in the following documents:

Information technology—Telecommunications and information exchange between systems—Local and metropolitan area networks specific requirements—Part 11: Wireless LAN Medium Access Control (MAC) and Physical Layer (PHY) Specifications (1999).

Information technology—Telecommunications and information exchange between systems—Local and metropolitan area networks specific requirements—Part 11: Wireless LAN Medium Access Control (MAC) and Physical Layer (PHY) Specifications (1999): High Speed Physical Layer in the 5 GHz Band, hereinafter "High Speed Physical Layer in the 5 GHz Band".

The contents of these standards documents are herein incorporated by reference for all purposes in their entirety.

The IEEE 802.11a standard employs orthogonal frequency division multiplexing (OFDM) as known in the art. In OFDM, the available bandwidth is effectively divided into a plurality of subchannels that are orthogonal in the frequency domain, each such subchannel being occupied by a "subcarrier" or tone. For each successive OFDM symbol, a complex value is assigned to each subcarrier. To create the baseband time domain signal for transmission, an IFFT is applied to a series of 64 (in 802.11a) complex subcarrier values to obtain 64 time domain samples. In 802.11a, some of the values are always zero and others carry pilot tones used for phase synchronization. The resulting series of time domain samples is augmented with a cyclic prefix prior to transmission. The use of the cyclic prefix assures the orthogonality of the subcarriers. The cyclic prefix addition process can be characterized by the expression:

$$[z(1) \ldots z(N)]^T \mapsto [z(N-v+1) \ldots z(N)z(1) \ldots z(N)]^T$$

Figure 1:
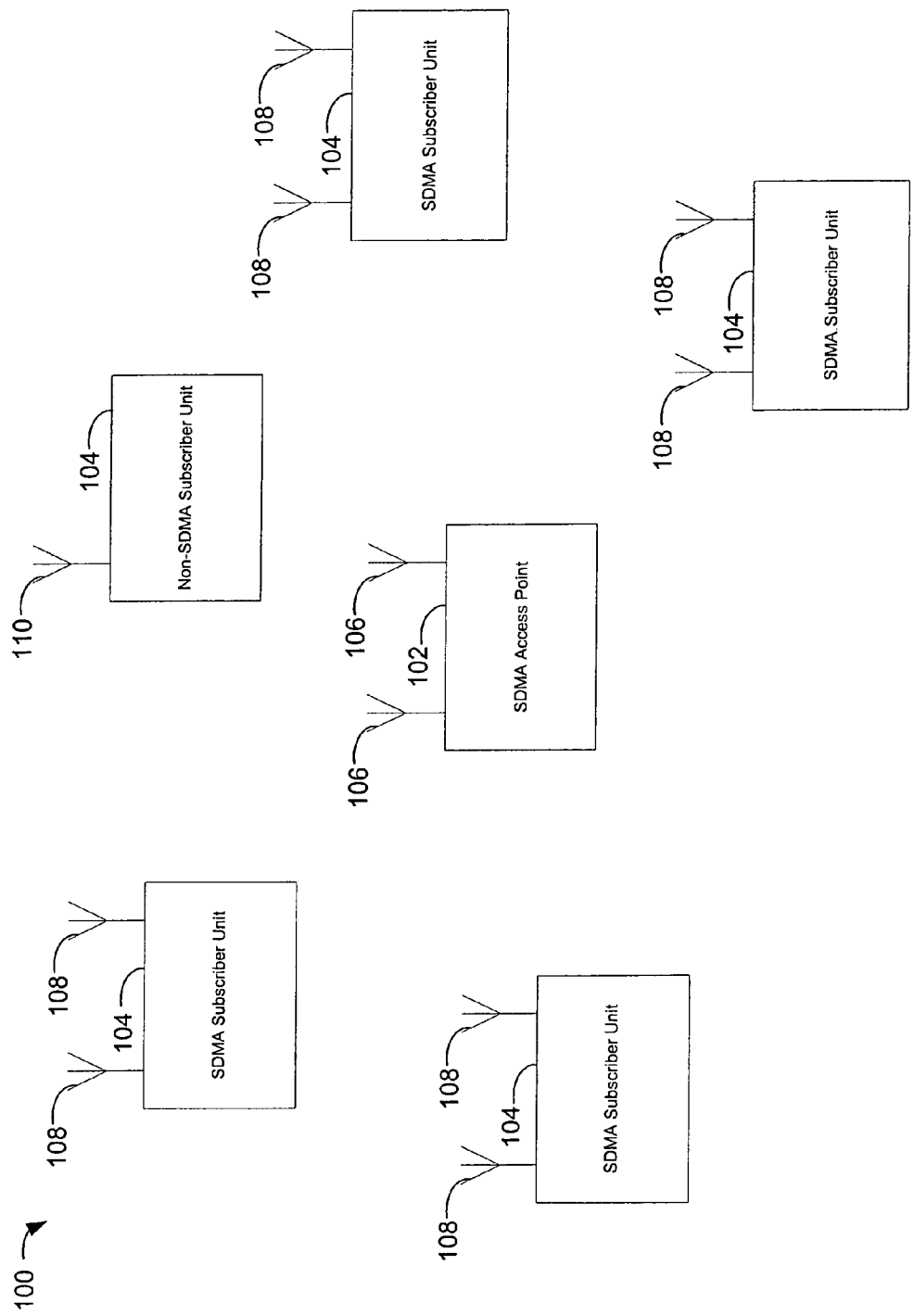
FIG. 1 depicts a wireless communication system employing SDMA techniques according to one embodiments of the present invention.

FIG. 1 depicts a wireless network 100 suitable for implementing one embodiment of the present invention. Included within wireless network 100 are an access point 102 and numerous subscriber units 104. Some of subscriber units 104 are capable of employing MIMO processing techniques to participate in SDMA operations whereas others are not. Access point 102 is equipped with two antennas 106 to support SDMA operations. Alternatively, the two depicted antennas 106 actually signify the use of two polarizations of the same antenna. The SDMA-capable ones of subscriber units 104 are also equipped with two antennas 108 or able to exploit dual polarizations. The subscriber units that are not capable of SDMA operation have but a single antenna 110. The SDMA-capable subscriber units may operate in SDMA mode or in a conventional mode. Although the SDMA-capable units are shown with two antennas or two polarizations it will be understood that the MIMO/SDMA processing techniques of the present invention may exploit a greater number of antenna elements and/or polarizations.

According to embodiments of the present invention, SDMA access point 102 may either transmit simultaneously to two or more of subscriber units 104 or simultaneously receive upstream transmissions from two or more of subscriber units 104. This capability is provided as an extension to the IEEE 802.11a standard. Operations are preferably in accordance with so-called "infrastructure" mode where communication is always either to or from access point 102 rather than directly between subscriber units 104. Furthermore, access point 102 and the SDMA-capable ones of subscriber units 104 incorporate SDMA-related capability extensions as described below.

Figure 2:
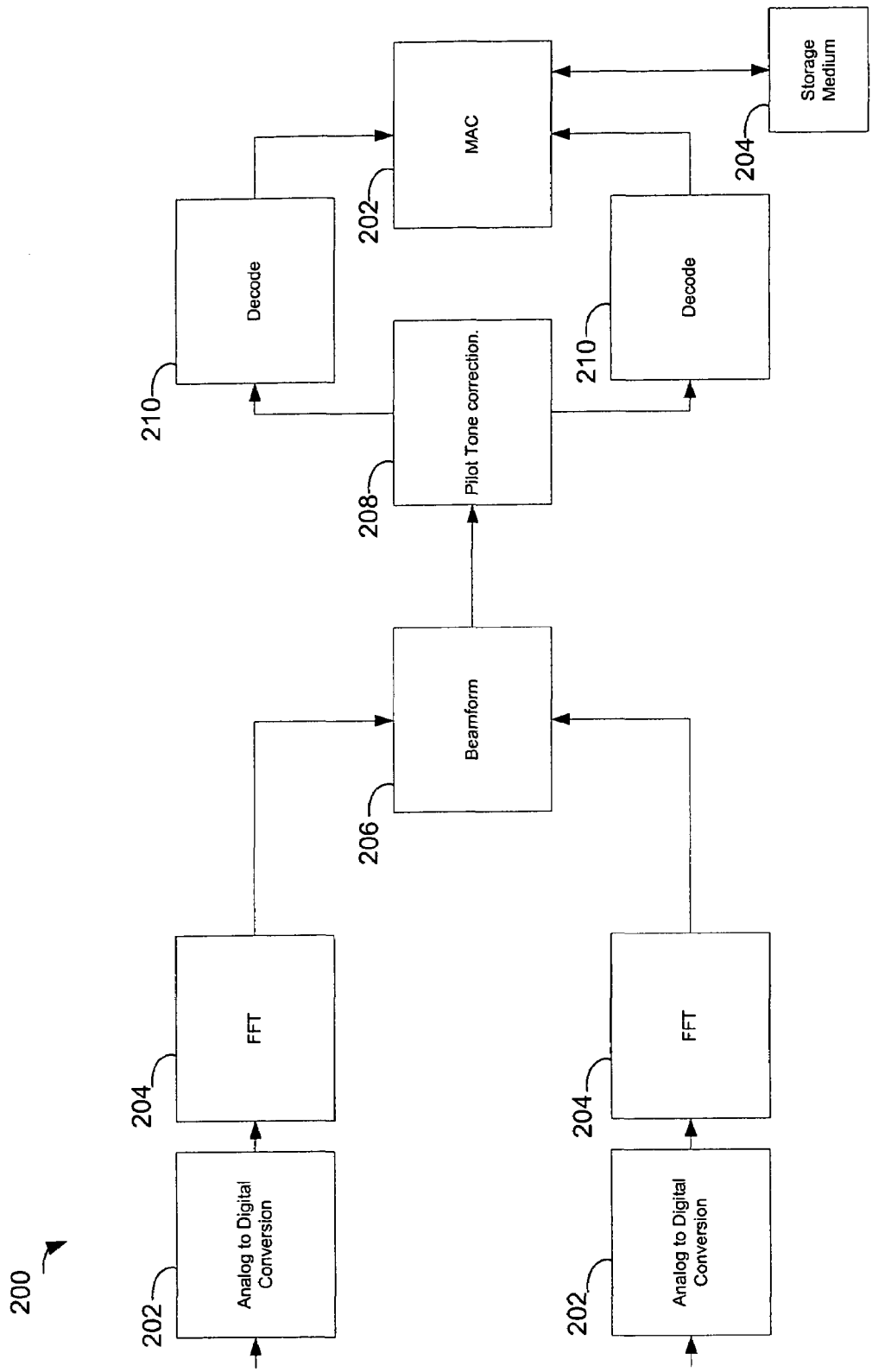
FIG. 2 depicts elements of a wireless receiver according to one embodiment of the present invention.

FIG. 2 depicts a receiver 200 as would be used in one access point 102 or one of the SDMA-capable ones of subscriber units 104. Individual RF/IF chains (not shown) are connected to each antenna (or antenna polarization) to recover analog signals suitable for conversion to digital samples from the RF signals received over the airwaves. There is an analog to digital converter 202 for each analog signal to recover digital samples. There are also two parallel FFT blocks 204 to perform time to frequency conversion and recover the subcarrier values for each OFDM symbol. Components to perform time and frequency synchronization in accordance with the 802.11a standard are omitted for simplicity of explanation.

The subcarrier values corresponding to each antenna or polarization are input to a beamformer 206. Beamformer 206 recovers the transmitted spatial subchannel data streams by applying a weighting matrix to the beamformer inputs. The weighting matrix may be based on a matrix channel estimate and possibly also on SINR (signal to interference plus noise ratio). There are many suitable ways of implementing the weighting matrix but this type of detail is not relevant to a discussion of the present invention. A pilot tone correction block 208 corrects phase offset among subcarriers within each OFDM symbol in accordance with the 802.11a standard. For each spatial subchannel, a decode block 210 performs deinterleaving, error correction decoding, and descrambling to reverse the corresponding processes at the transmit end. The outputs of decode block 210 are recombined into MAC layer packets by MAC layer processor 202 which is shared with the transmitter of FIG. 3. FIG. 2 is depicted with reference to SDMA operation. For SISO operation, a single conventional 802.11a receiver chain is used without any beamforming processing.

Figure 3:
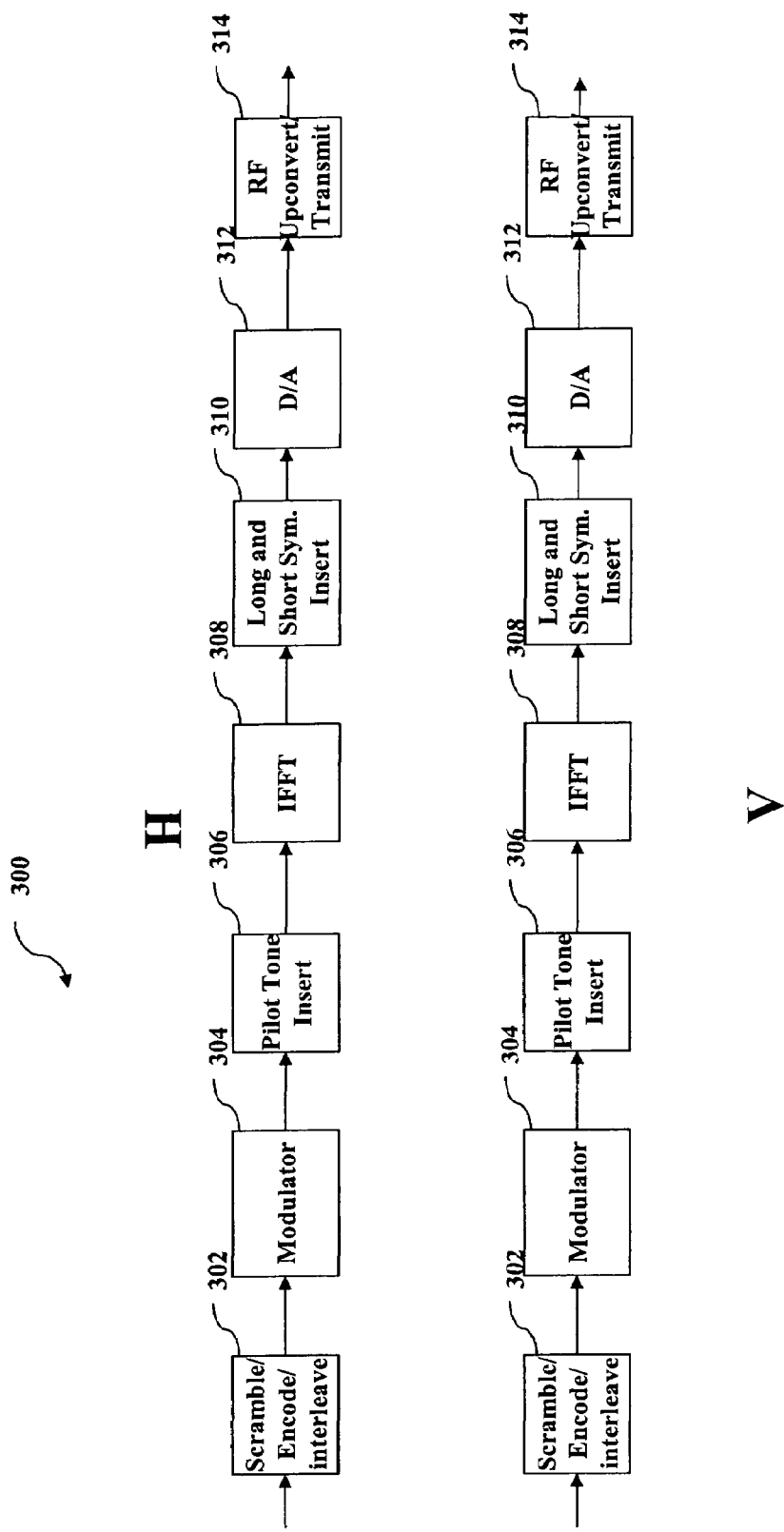
FIG. 3 depicts elements of a wireless transmitter according to one embodiment of the present invention.

FIG. 3 depicts an SDMA transmitter system 300 according to one embodiment of the present invention. In this depicted implementation, signals for the horizontal and vertical antenna polarizations are generated separately in parallel. It is also possible to employ spatial processing at the transmitter end by defining antenna element weights corresponding to two spatial subchannels. Here, instead a first spatial subchannel is simply mapped to the horizontal antenna polarization and a second spatial subchannel is mapped to the vertical antenna polarization.

Data from the MAC layer processor is first scrambled, encoded, and interleaved in an encoding block 302 as defined by the IEEE 802.11a standard. Modulators 304 translate the coded data bits into complex values to be assigned to OFDM subcarriers in accordance with the currently selected modulation scheme (4-QAM, 16-QAM, etc.) A pilot tone insertion block 306 inserts pilot tones at subcarrier positions defined by the IEEE 802.11a standard to support phase offset synchronization at the receiver. IFFT blocks 308 convert groups of 64 subcarrier values from the frequency domain to the time domain. The output is a succession of OFDM symbols carrying payload data.

The IEEE 802.11a standard also provides for the use of a preamble including special symbols for use in synchronization and carrier estimation. In a transmitted frame or packet, this preamble precedes the data-carrying OFDM symbols. The preamble includes so-called short and long symbols and is modified in accordance with embodiments of the present invention. The portion of the packet including the long symbols is modified to facilitate MIMO channel estimation as it will be explained in greater detail below. Insertion blocks 310 insert the preamble symbols.

The digital signals generated by insertion blocks 310 are converted to analog by digital to analog converters 312. The complex baseband waveforms output by converters 312 are upconverted to an intermediate frequency (IF), amplified and filtered at the IF, converted to the transmission radio frequency (RF), further amplified and filtered, and then transmitted via the appropriate antenna element. Blocks 314 represent the various analog processing steps. It will be appreciated that the elements shown in FIGS. 2-3 together make up an SDMA-capable physical layer transceiver.

Figure 4:
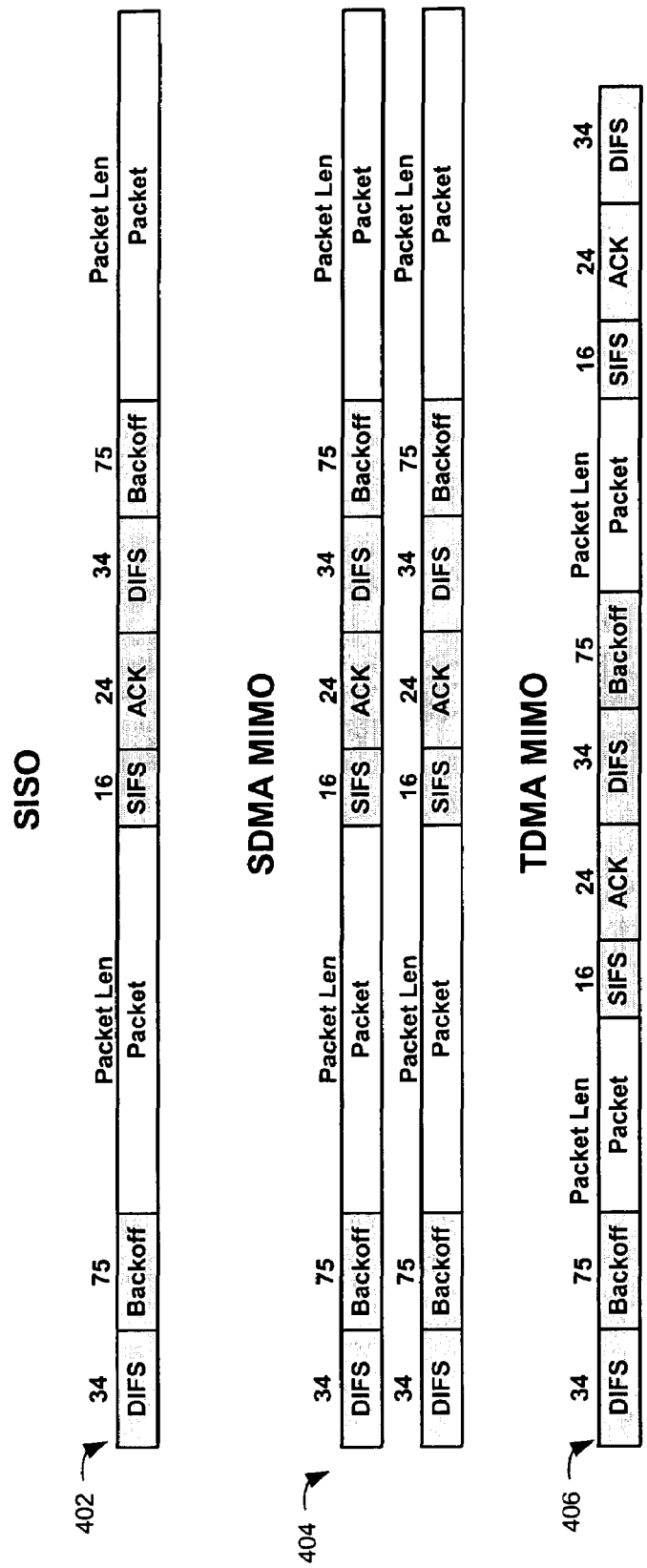
FIG. 4 illustrates a comparison of SDMA MIMO data transport efficiency to TDMA MIMO efficiency and standard 802.11a efficiency.

Using SDMA MIMO techniques provides highly beneficial improvements in system capacity in the IEEE 802.11 context. This can be seen in reference to FIG. 4 which compares conventional single-input single-output (SISO) packet transport with SDMA MIMO and with TDMA MIMO. The difference between SDMA MIMO and TDMA MIMO is that in the latter multiple spatial subchannels are used to communicate between the central access point and the same subscriber unit whereas in the former the multiple subchannels are used to communicate with different subscriber units.

The SISO example 402 shows the transmission of two packets, one after another. There are large inefficiencies due to the various overhead fields known to those of skill in the art including DIFS, SIFS, ACK, and backoff. A representative number of bytes for each overhead field is shown. In the SDMA MIMO example 404, throughput is improved since two packets are sent simultaneously and four packets are sent in the time required to send two in the SISO example. Except for the preambles and possible padding as will be explained below, the packets are generally formatted in accordance with the 802.11 standard. In the TDMA MIMO example 406, the data field of a single packet is essentially divided into half and sent through two parallel subchannels. Thus from the MAC layer perspective, the time period occupied by the data portion of the packet is halved. Unfortunately, due to the need to preserve backward compatibility, the overhead fields do not exploit the parallel subchannels and remain at the same length. SDMA 802.11 operation will now be described in greater detail. The SDMA-capable subscriber units are preferably grouped by distance from the access point. When the access point chooses subscriber units with which to communicate simultaneously in the same carrier frequency, it picks ones belonging to the same group. In this way simultaneous transmissions may be synchronized more precisely for simultaneous arrival at the access point. Also, received power levels will not be highly disparate and both signals will be recoverable within the receiver's dynamic range. The knowledge of subscriber unit distances may be obtained by the access point in any way. For example, subscriber unit distances may be programmed manually. Subscriber units may be polled by the access point for GPS-obtained location information from which distances may be readily inferred. Also, the access point may send a ranging transmission and measure response time to obtain distance.

Figure 5:
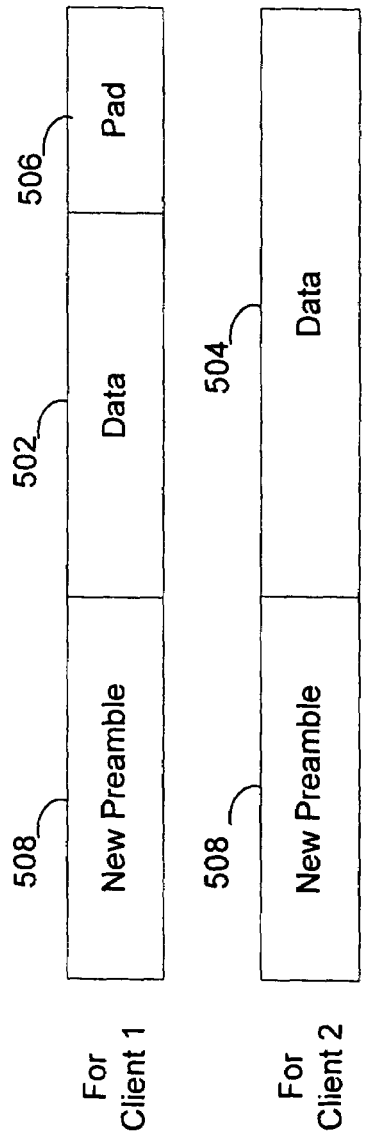
FIG. 5 depicts packet structure used in downstream communication according to one embodiment of the present invention.

FIG. 5 depicts the simultaneous downstream transmission of multiple packets (502 and 504) from the access point to multiple subscriber units. The access point transmits data packets to subscriber units in the same SDMA group simultaneously, with the start of the packets being synchronized. The shorter packet(s) (502 here) are padded (with a pad field 506) to equalize packet lengths and thereby synchronize the packet ends. This results in synchronized acknowledgements (formatted in accordance with IEEE 802.11) from the subscriber units in that acknowledgements are delayed until after both packets have completed transmission.

FIG. 5 also shows that the packets are preceded by a preamble field 508 that is modified in comparison to the 802.11a standard. This preamble will be discussed in greater detail below.

Figure 6:
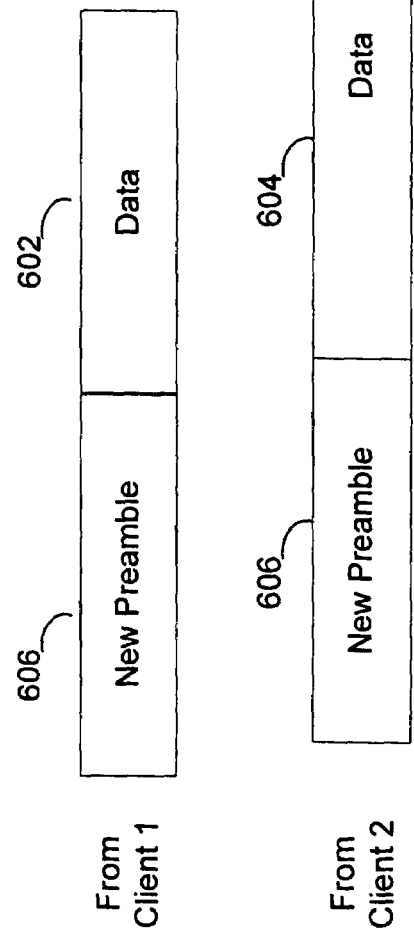
FIG. 6 depicts packet structure used in upstream communication according to one embodiment of the present invention.

FIG. 6 depicts the simultaneous upstream transmission of multiple packets (602 and 604) from multiple subscriber units to the access point. The access point will have polled the two subscriber units for simultaneous upstream transmission. The grouping of the subscriber units facilitates simultaneous reception of start of packet. Start of packet is shown as slightly offset between the packets but arrival should be synchronized to within a few hundred nanoseconds. As arrival offset increases, multipath delay spread immunity declines, eventually leading to failure of packet reception.

The subscriber units can acquire timing from the SDMA beacon and adjust timing offset based on messages from the access point. Or clients can be divided into groups with similar range to the access point. Grouping is also helpful in ensuring that both transmissions are received at comparable power levels, even before application of automatic gain control, and thus can be simultaneously received within receiver dynamic range. Coordination of upstream transmissions is provided by a modified version of the existing point coordination function (PCF). The hybrid coordination function (HCF) of 802.11e can be similarly modified.

One modification is that the access point will not be able to acknowledge the upstream transmissions until both subscriber units have completed their simultaneous packet transmissions which may vary in length. The acknowledgements themselves are (as in the downstream case) formatted in accordance with 802.11 but transmitted simultaneously via the spatial subchannels in SDMA mode. Accordingly, subscriber units will receive their acknowledgements at the end of the shared upstream transmission period. As with the downstream packets of FIG. 5, there is also a preamble 602 with a new structure as will be explained below.

Figure 9:
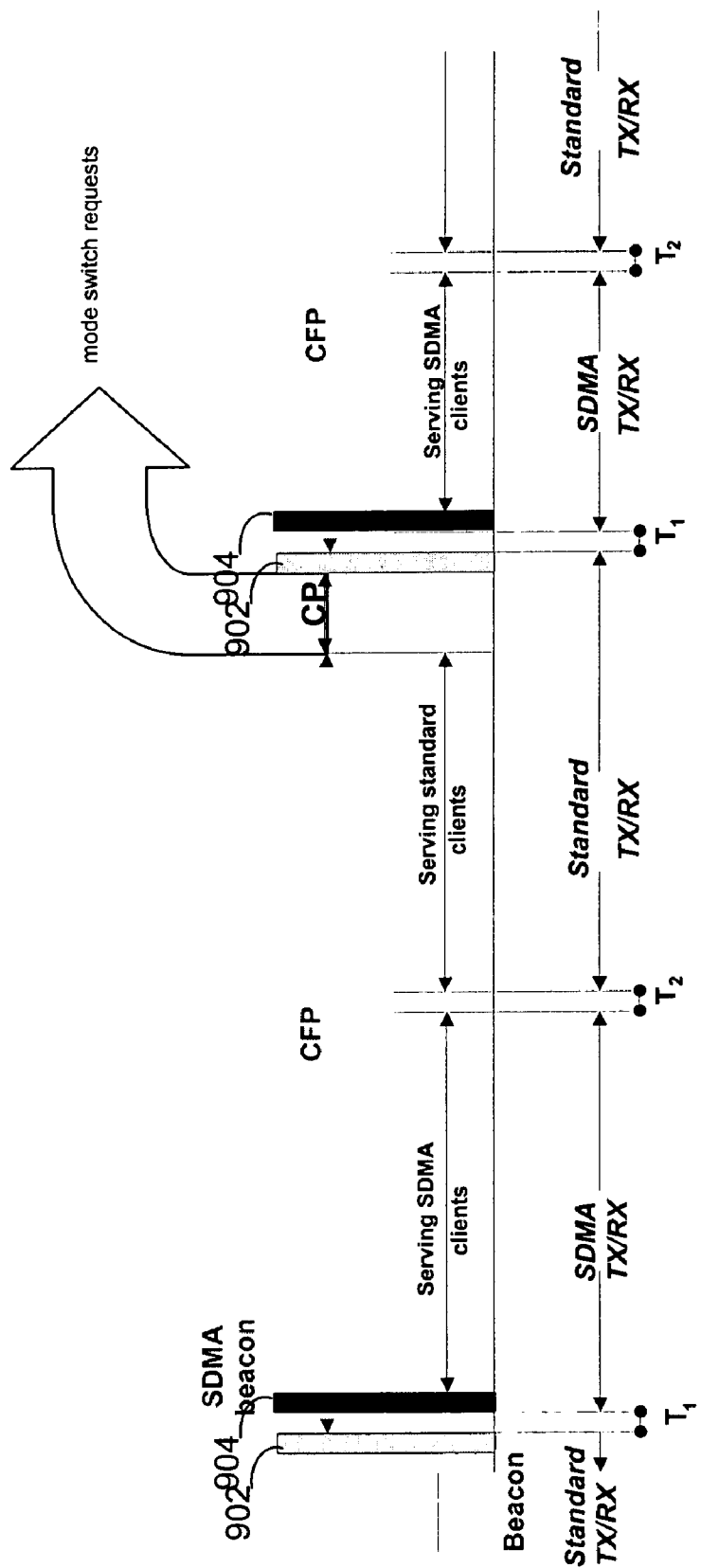
FIG. 9 depicts coordination of SDMA subscriber units and non-SDMA subscriber units according to one embodiment of the present invention.

FIG. 9 depicts a timeline for SDMA MAC operations. It will be appreciated that the operation of wireless network 100 shares features in common with conventional 802.11 "infrastructure mode" networks. Transmission time is divided between a contention period (CP) and a contention free period (CFP). During the CP, devices transmit when they do not hear other transmissions. During the CFP, access point 102 controls access to the transmission medium and polls subscriber units to transmit data that they might have. Downstream data may be sent along with polling information.

In conventional 802.11 operation, each CFP begins with a special beacon frame 902 that defines the beginning of the CFP and indicates its duration. In systems according to the present invention, this beacon may be transmitted in a non-SDMA or single-input single-output (SISO) mode. A second SDMA beacon 904 is then transmitted in an SDMA mode using two parallel spatial subchannels. A time T1 separates beacons 902 and 904.

The SDMA beacon 904 serves multiple purposes. SDMA-capable subscriber units that are in SDMA mode learn of the length of the CFP from SDMA beacon 904. SDMA-capable subscriber units that are not in SDMA-mode switch to SDMA mode to measure channel conditions and determine whether or not they should switch to SDMA mode. The measurements are made on the preamble of beacon 904. Preamble details are as discussed below. SDMA beacon 904 may also inform subscriber units of spatial subchannel assignments. Alternatively, these subchannel assignments may be transmitted downstream in other management messages. Non-SDMA capable modes will ignore beacon 904 as directed by the parameters of beacon 902.

Access point 102 maintains lists of subscriber units operating in SDMA mode and subscriber units operating in SISO mode (including non-SDMA-capable subscriber units.) The CFP is divided into two subperiods. A time T2 separates the subperiods. In a first subperiod, access point 102 communicates with the subscriber units that are operating in SDMA mode. In a second subperiod, access point 102 communicates with the subscriber units that are operating in SISO mode. Subscriber units 104 communicate data in response to a polling request from access point 102 as defined by the IEEE 802.11 standard and/or they receive downstream data from access point 102.

The division of the CFP into subperiods reduces the number of time-consuming mode changes for access point 102 to the minimum. If there is time left in the CFP, access point 102 can repeat the subperiods to fill up the available time. Upon completion of the CFP, access point 102 transmits the 802.11-defined CF-End message in both SISO mode and SDMA mode so that all units know that the contention period (CP) will begin.

In one embodiment, all CP transmissions occur in SISO mode. According to the present invention, these may include specially modified messages for affiliating to the network as an SDMA-capable node and for requesting and acknowledging mode shifts. In particular, embodiments of the present invention may take advantage of Association, Reassociation, Disassociation Request, and Response Frames as specified by 802.11. These frames may be augmented with a special SDMA information element. In one implementation, this SDMA information element has a length of 1 octet. The least significant bit indicates SISO operation or SDMA operation while the remaining bits can be used for version identification.

When an SDMA-capable subscriber unit starts up, it transmits an Association Request to access point 102 in accordance with 802.11a. However, this Association Request includes an SDMA information element that specifies SDMA mode operation in accordance with the present invention. Access point 102 replies with an Association Response message that also includes the SDMA information element specifying SDMA mode operation. The subscriber unit then switches to SDMA mode and access point 102 adds the subscriber unit to the list of SDMA-capable subscriber units. If the subscriber unit joins a network where the access point is not SDMA-capable, the received Association Response will lack the SDMA information element and the subscriber unit will therefore remain in SISO mode. This preserves backward compatibility with non-SDMA equipment. Reassociation Requests may be substituted for Association Requests where appropriate.

Figure 7:
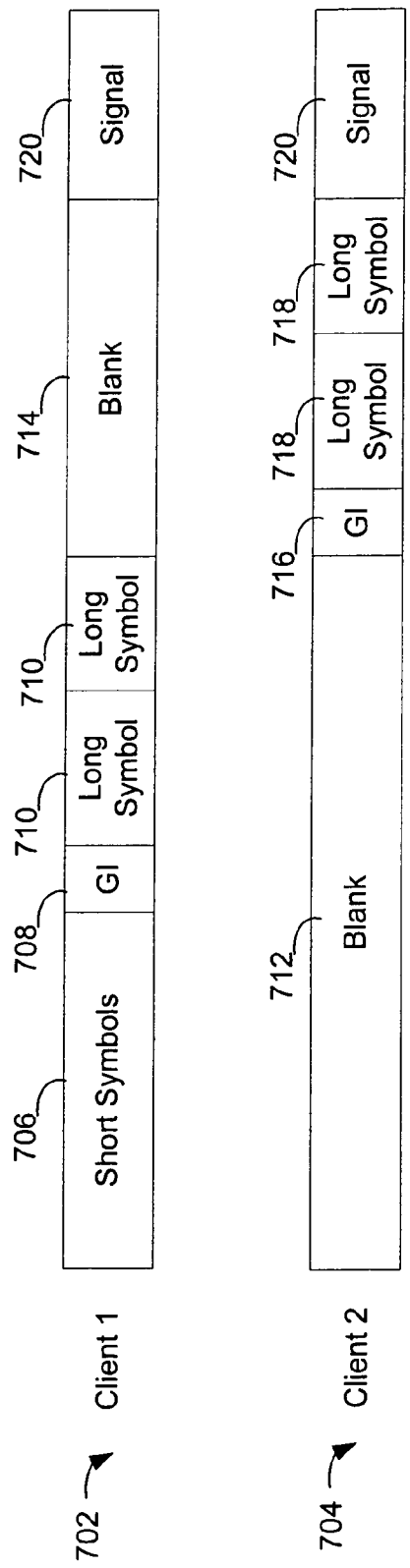
FIG. 7 depicts a first preamble structure according to one embodiment of the present invention.

FIG. 7 depicts preambles 702 and 704 as may be simultaneously transmitted either by two simultaneously transmitting subscriber units or by a single access point according to one embodiment of the present invention. Preamble 702 begins with 10 short symbols 706 that are specified by the 802.11a standard and that are used for signal detection, automatic gain control, and frequency offset estimation.

Each short symbol is specified to be 0.8 microseconds long. Following the short symbols 706, there is a guard interval 708 followed by a channel training period where two long symbols 710 are transmitted. The long symbols are specified by the 802.11a standard and are used for channel estimation. During short symbols 706, guard interval 708, and long symbols 710, the other preamble 704 has a quiet period 712. After long symbols 708, preamble 702 enters a quiet period 714. During quiet period 714 of preamble 702, preamble 704 includes a guard interval 716 followed by long symbols 718. Then both preambles include signal fields 720 that designate the modulation type and length of the packet that follows.

Thus it will be seen that only one spatial subchannel transmits 802.11a short symbols. The long symbols are used for channel estimation by the receiver in the manner described in U.S. patent application Ser. No. 10/335,500; filed Dec. 31, 2002, entitled HIGH DATA RATE WIRELESS BRIDGING. However, after the preambles are complete, a subscriber unit receiver need only decode the spatial subchannel addressed to it. As previously explained, the subscriber subchannel assignment information is contained in the beacon or other management message. The access point receiver will decode both subchannels.

Figure 8:
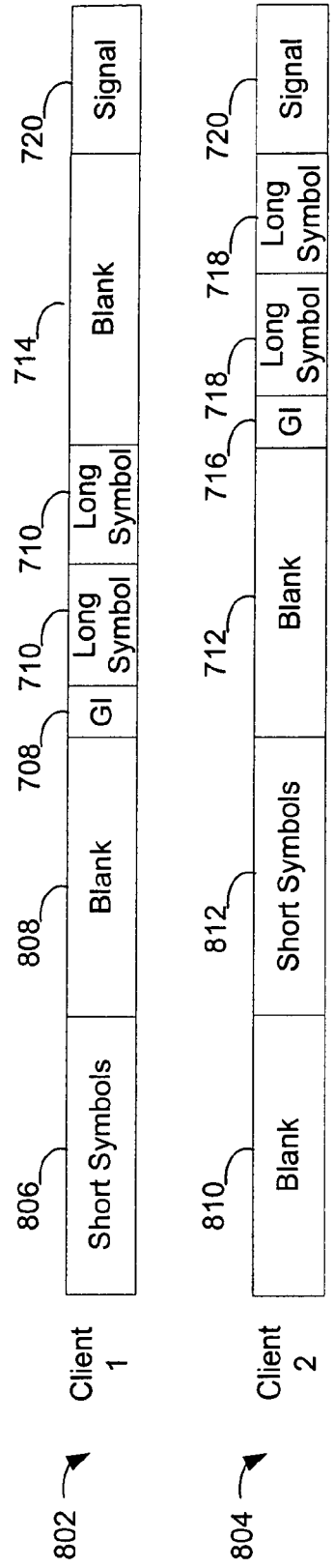
FIG. 8 depicts a second preamble structure according to one embodiments of the present invention.

In an alternate preamble structure depicted in FIG. 8, both preambles 802 and 804 incorporate short symbols. A preamble 802 begins with short symbols 806 followed by a blank period 808. During short symbols 806, preamble 804 includes a blank period 810. During blank period 808, preamble 804 includes short symbols 812. Long symbol transmission for channel estimation purposes is as in FIG. 7.

For either preamble structure, it will preferably be the case that the access point acts as the timing master and that the subscriber units are timing slaves. Subscriber units can obtain frequency and timing synchronization based on the short symbols preambles of the SDMA beacons. Because simultaneous transmission generally requires more precise time synchronization, further fine timing synchronization of the subscriber units may be based on downstream adjustment commands from the access point made based on measurements of upstream transmissions. The short symbols of SDMA CFP packets transmitted by the access point can also be used for start of packet detection and for automatic gain control. The short symbols transmitted by the subscriber units are used for start of packet detection and automatic gain control at the access point.

In comparing the two preamble structures of FIG. 7 and FIG. 8, it will be appreciated that the embodiment of FIG. 8 allows timing and frequency synchronization as well as automatic gain control and start of packet detection to be based on both spatial subchannels at the expense of a longer overall preamble period. For upstream transmissions, automatic gain control can thus be performed separately for the two subscriber units. This permits less precise grouping of subscriber units for power control and timing control purposes. Downstream implementation of FIG. 8 may also be simpler due to the symmetry between the spatial subchannels.

The matrix channel estimate obtained from the long symbols is also used by SDMA-capable subscriber units to determine whether there is sufficient isolation between the spatial subchannels to allow for SDMA operation. The same criteria set forth for MIMO operation in U.S. patent application Ser. No. 10/335,500 and U.S. patent application Ser. No. 10/197,300 may be used for SDMA operation according to the present invention. SDMA-capable subscriber units that are operating in SDMA-mode measure isolation between subchannels based on the preambles of packets received during the CFP. SDMA-capable subscriber units that are operating in non-SDMA mode switch to SDMA mode temporarily during beacon 904 to measure isolation. For example, 10 dB of isolation between spatial subchannels may be required for SDMA operation.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. Also, with use of precise timing and frequency adjustment control of the subscriber units on the part of the central access point and sufficient receiver dynamic range it is possible to greatly relax or even remove the requirements of selecting simultaneous transmitters from the same distance group. Also, SDMA operation may be used in peer-to-peer type networks or mesh networks, etc., where there is no designated "access point."

The invention claimed is:

1. A method for operating an access point in a MIMO wireless communication system, said method comprising:
    inserting a first preamble into a first packet and a second preamble into a second packet, at least one of said first and second preambles comprising symbols for use in synchronization and both of said first and second preambles comprising symbols for use in channel estimation, wherein said first and second preambles are each configured with a quiet period to allow transmission of one of said symbols in said other packet;
    sending said first packet to a first subscriber unit via a first spatial subchannel; and
    sending said second packet to a second subscriber unit via a second spatial subchannel, said first spatial subchannel and said second spatial subchannel occupying the same bandwidth;
    wherein said second packet has greater data length than said first packet; and
    wherein sending said first packet and sending said second packet begin and end substantially simultaneously.

2. The method of claim 1 further comprising:
    receiving acknowledgements of said first packet and said second packet after completion of transmission of said first packet and said second packet.

3. The method of claim 2 wherein said first packet is padded so that it will end simultaneously with said second packet.

4. A method for operating an access point in a MIMO wireless communication system, said method comprising:
    for a plurality of subscriber units of said access point, identifying ranges of said subscriber units from said access point;
    assigning a first group of said subscriber units to transmit simultaneously during a first upstream transmission slot; and
    assigning a second group of said subscriber units to transmit simultaneously during a second upstream transmission slot; and
    wherein subscriber units of said first group are chosen to have substantially similar ranges to one another and subscriber units of said second group are chosen to have substantially similar ranges to one another.

5. The method of claim 4 further comprising:
    transmitting a beacon message identifying a time period for contention-free transmission between said access point and said subscriber units of said first and second groups.

6. The method of claim 5 further comprising transmitting said beacon message in a contention free period as defined by IEEE 802.11.

7. A method for operating an access point in a MIMO communication system, said method comprising:
receiving a first packet from a first subscriber unit within a first spatial subchannel wherein a second packet has commenced transmission substantially simultaneously with said first packet, said second packet being transmitted within a second spatial subchannel sharing bandwidth with said first spatial subchannel, wherein said second packet is longer than said first packet; and
transmitting an acknowledgement of said first packet to said first subscriber unit only after completing reception of said second packet;
wherein said first packet comprises a first preamble and said second packet comprises a second preamble, at least one of said first and second preambles comprising symbols for use in synchronization and both of said first and second preambles comprising symbols for use in channel estimation, wherein said first and second preambles are each configured with a quiet period to allow transmission of one of said symbols in said other packet.

8. The method of claim 7 wherein said acknowledgement is formatted in accordance with IEEE 802.11.

9. Apparatus for operating an access point in a MIMO wireless communication system, said apparatus comprising:
an insertion block configured to insert a first preamble into a first packet and a second preamble into a second packet, at least one of said first and second preambles comprising symbols for use in synchronization and both of said first and second preambles comprising symbols for use in channel estimation, wherein said first and second preambles are each configured with a quiet period to allow transmission of one of said symbols in said other packet;
a first transmitter block that sends said first packet to a first subscriber unit via a first spatial subchannel; and
a second transmitter block that sends said second packet to a second subscriber unit via a second spatial subchannel, said first spatial subchannel and said second spatial subchannel occupying the same bandwidth;
wherein said second packet has greater data length than said first packet; and
wherein sending said first packet and sending said second packet begin and end substantially simultaneously.

10. The apparatus of claim 9 further comprising:
a receiver system that receives acknowledgements of said first packet and said second packet after completion of transmission of said first packet and said second packet.

11. The apparatus of claim 9 wherein said first packet is padded so that it will end simultaneously with said second packet.

12. Apparatus for operating an access point in a MIMO wireless communication system, said apparatus comprising:
a MAC layer processor that, for a plurality of subscriber units of said access point, identifies ranges of said subscriber units from said access point, assigns a first group of said subscriber units to transmit simultaneously during a first upstream transmission slot, and assigns a second group of said subscriber units to transmit simultaneously during a second upstream transmission slot; and
wherein subscriber units of said first group are chosen to have substantially similar ranges to one another and subscriber units of said second group are chosen to have substantially similar ranges to one another.

13. The apparatus of claim 12 wherein said MAC layer processor further transmits a beacon message identifying a time period for contention-free transmission between said access point and said subscriber units of said first and second groups.

14. The apparatus of claim 13 wherein said beacon message is transmitted in a contention free period as defined by IEEE 802.11.

15. Apparatus for operating an access point in a MIMO communication system, said apparatus comprising:
a receiver system that receives a first packet from a first subscriber unit within a first spatial subchannel wherein a second packet has commenced transmission substantially simultaneously with said first packet, said second packet being transmitted within a second spatial subchannel sharing bandwidth with said first spatial subchannel, wherein said second packet is longer than said first packet; and
a transmitter system that transmits an acknowledgement of said first packet to said first subscriber unit only after completing reception of said second packet;
wherein said first packet comprises a first preamble and said second packet comprises a second preamble, at least one of said first and second preambles comprising symbols for use in synchronization and both of said first and second preambles comprising symbols for use in channel estimation, wherein said first and second preambles are each configured with a quiet period to allow transmission of one of said symbols in said other packet.

16. The apparatus of claim 15 wherein said acknowledgement is formatted in accordance with IEEE 802.11.

* * * * *